Oct. 11, 1932.   J. WHYTE   1,882,050
BRAKE
Filed Nov. 17, 1928   2 Sheets-Sheet 1

Inventor
John Whyte
By Churdehl Parker Carlson
Attys

Oct. 11, 1932.  J. WHYTE  1,882,050
BRAKE
Filed Nov. 17, 1928   2 Sheets-Sheet 2
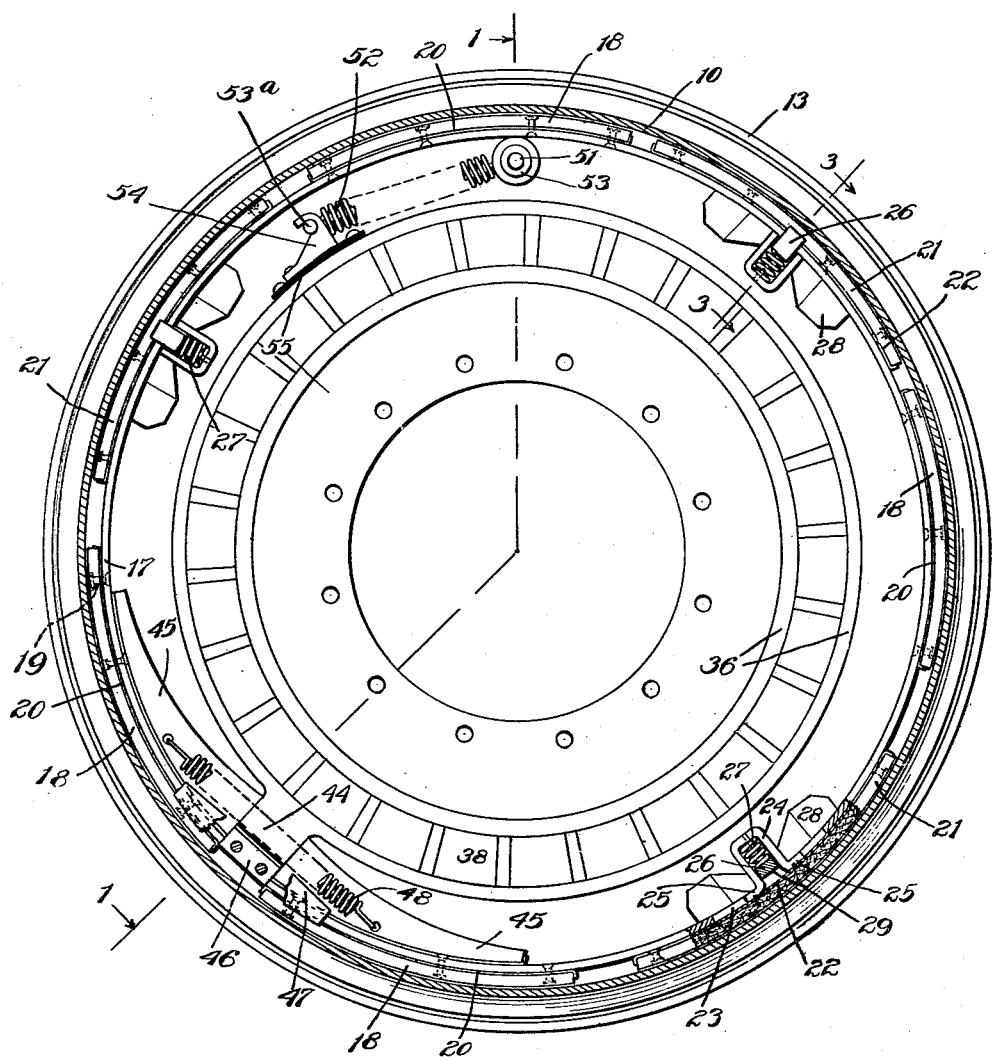
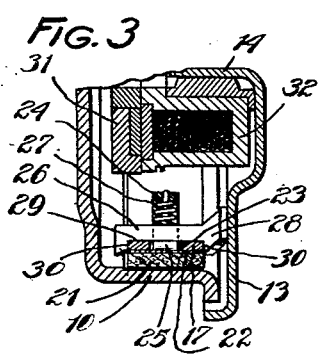
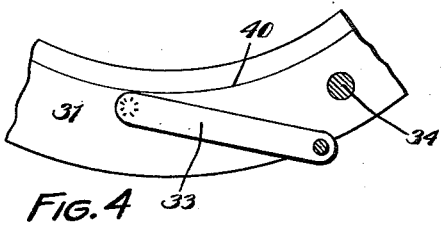
Inventor
John Whyte Patented Oct. 11, 1932

1,882,050

UNITED STATES PATENT OFFICE

JOHN WHYTE, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed November 17, 1928. Serial No. 320,129.

This invention relates to improvements in retarding mechanisms such as friction brakes, and more particularly to that type of brake in which the non-rotatable friction surface is on a flexible band.

Band brakes both of the external or contracting and internal or expanding types have certain recognized properties which have led to the adoption of such brakes on automotive vehicles, particularly passenger automobiles. Among these characteristics are simplicity, compactness and cheapness of construction, the provision of a large effective braking area, the equalization of the braking pressure and therefore the wear on such area and their ability to produce maximum retarding effect for a minimum amount of applied pressure and leverage.

The powerful character of such brakes is generally attributed to the so-called "wrapping" or self-energizing action by which a braking force in addition to the applied force is derived from the motion of the vehicle when a considerable length of band is pressed against a rotating drum surface. Under such conditions the adjacent portions of the band by reason of the drum rotation exert increased forces on each other with the result that the band of itself builds up an extreme radial pressure. Under high applied pressures and with a long length of band in contact with the drum, this action cumulates and becomes so violent that it no longer is a function of the applied actuating force. The brake is thus rendered uncontrollable by the driver, is jerky in its action, and is apt to cause unintentional locking of the vehicle wheels.

On account of this inherent and dangerous property, band brakes are now used by comparatively few automotive engineers, particularly those brakes of the internal or expanding type where the violent wrapping action is most aggravated. In addition, brakes having an elongated flexible friction surface are subject to chattering, are difficult to adjust and to maintain in adjustment, and are irregular and variable in their action.

The primary object of the present invention is to provide a friction brake having all of the recognized advantages of band brakes without possessing any of the objectional properties of such brakes. This object is accomplished generally by the provision of a novel braking device of the band type constructed in a manner such as to moderate or break up the wrapping action normally attending the use of a braking means of this character, thereby preventing the auxiliary actuating force resulting from such action from building up or cumulating to a degree such as to render the brake uncontrollable.

Another object is to provide a new and improved brake having a flexible braking device arranged to create wrapping actions of controllable magnitudes at a plurality of spaced points around a coacting drum surface and to augment the resulting frictional force and apply the same to the drum as radially directed pressures.

The foregoing object may be carried out through the use of a novel brake band, coacting with a rotatable drum and having a plurality of annularly spaced friction surfaces between adjacent ones of which is an auxiliary friction element held against circumferential movement and adapted to be pressed by the band yieldably against the drum.

A further object is to provide a braking device of the above character in a brake of the internal expanding type.

Still another object is to provide a brake having a friction means of the above character and a mechanism for actuating said means deriving its energy from the momentum of the part to be braked.

A general object of the invention is to provide a brake which is simplified and rendered economical in construction by minimizing the number of moving parts and by the elimination of rigid shoe structures, cams, toggles, etc.; which is powerful and sensitive in operation for all degrees of braking; which is adaptable to various shapes and sizes of steering knuckles; which will follow the contour of its drum regardless of the eccentricity or untrueness of the drum surface under all operating conditions, and which will, without adjustment, practically outlast the service life of an ordinary automobile.

Other objects and advantages of the invention will become apparent from the following detailed description taken in connection with the accompanying drawings, in which:

Fig. 2 is a section taken along the line 2—2 of Fig. 1.

Figure 1:
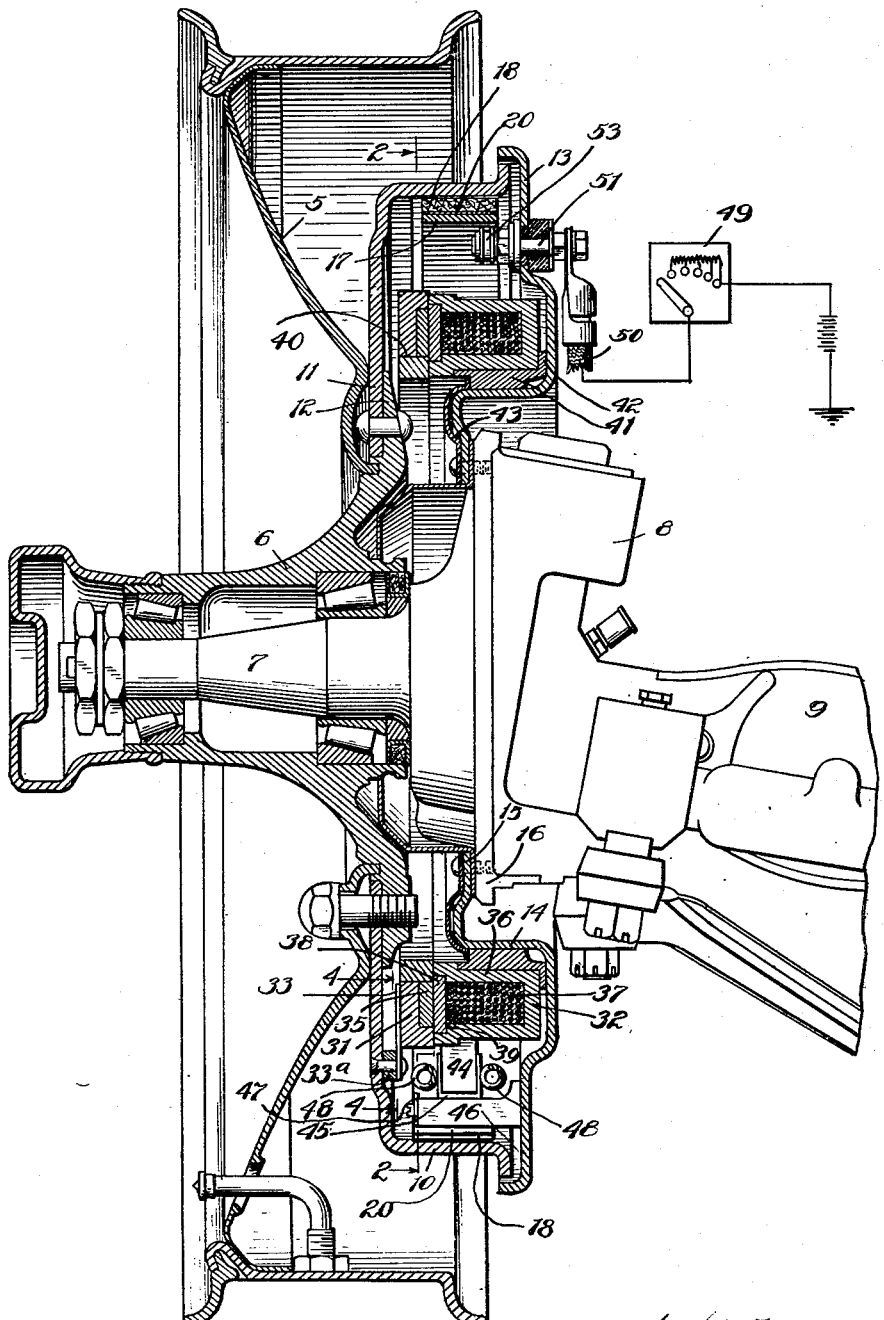
Fig. 1 is a sectional view of an automobile wheel equipped with a brake embodying the features of the present invention, the particular section being taken on the line 1—1 of Fig. 2.

Figs. 3 and 4 are fragmentary sectional views taken respectively along the lines 3—3 of Fig. 2 and 4—4 of Fig. 1.

While I have shown in the drawings and will describe herein one embodiment of the invention, it is to be understood that I do not intend to be limited thereby but aim to cover all modifications and alternative constructions falling within the spirit and scope of the invention as expressed in the appended claims.

In its exemplary form shown in the drawings, the brake is applied to a front wheel 5 of an automotive vehicle whose hub 6 is rotatably mounted through the usual bearings on a spindle 7 having a forked steering knuckle 8 which is swiveled on one end of an axle 9. The rotatable part of the brake is in the form of a pressed metal drum 10 which has a flange 11 secured on the inner side of the wheel to a hub flange 12 and which provides an internal friction surface of cylindrical contour with its axis coincident with that of the wheel.

The inwardly opening end of the drum is closed by an annular metal plate 13 overlying the edge of the drum and having its inner edge pressed inwardly to form a cylindrical portion 14 terminating in a flange 15 which is suitably secured as by a plurality of screws to a flange 16 on the steering knuckle. A central recess is thus defined which is of a diameter sufficient to accommodate the knuckle and permit location of its pivotal axis closely adjacent the wheel.

In the present instance, the braking means proper or non-rotatable part of the brake is supported for gripping engagement with the internal drum surface and has a coacting friction surface which occupies substantially the entire drum circumference. Part of this surface is provided by a unitary braking device in the form of a floating flexible band which extends circumferentially around the drum and has its ends arranged adjacent each other for relative movement to control the application and release of the brake as a whole. The band comprises a strip 17 of resilient metal such as steel which gives the desired strength, and a plurality of friction elements 18 of material different from that of the strip forming segmental coverings for the strip which have external surfaces conforming to the internal contour of the drum.

Preferably the coverings are composed of an asbestos base material molded into proper shape under high pressure. Such a non-metallic composition possesses higher friction properties, greater resistance to wear, and produces a smoother braking action than is attainable by a brake band presenting a metallic surface to the drum. At the same time the covering has the degree of flexibility required to follow the drum contour and to produce the wrapping action which is utilized in the present brake. On the other hand, the band as a whole possesses sufficient rigidity to effectually prevent chattering.

To facilitate manufacture of the brake unit as a whole, each friction element 18 is seated in and the segment as a whole secured to a sheet-metal backing-plate 20 to the external surface of the metal strip 17 as by rivets 19. Each element, therefore, constitutes an integral part of the brake band. The ends of each plate 20 may be turned outwardly to afford additional means for holding its element and the strip against relative circumferential movement.

The uncontrollable wrapping action which normally develops in a band brake having a continuous friction surface of substantial length, is broken up and thereby rendered less violent with the present band by interrupting the friction surface at spaced points around the drum. This is accomplished by spacing the elements 18 along the strip 17 so as to leave the strip uncovered for a substantial circumferential length, the distance between the adjacent ends of the elements being, in the present instance, slightly greater than the circumferential length of each individual element. Thus, when the band is expanded against the rotating drum surface, wrapping actions are created by the separate friction elements 18 which are made long enough to allow for the development of self-energizing forces of considerable magnitudes. At the same time, the elements are short enough to prevent, under any operating conditions, the building up of a wrap action which is uncontrollable.

The friction elements 18 are arranged symmetrically with respect to a diametrical plane of the drum which passes between the ends of the band, so that the same wrapping action is developed in either direction of rotation of the drum when the band is expanded. To this end, two of the elements are secured to the strip 17 immediately adjacent its respective ends while the other two of the four elements herein employed are spaced equidistant from the ends of the strip.

To prevent undue flexing of the uncovered portions of the strip 17 when it is expanded, a plurality of auxiliary friction elements 21 are interposed between the strip and the drum and receive as a uniformly distributed pressure the radial thrust exerted by the band and serve to transmit such pressure to the drum. These elements are, in the present instance, composed of the same material and constructed in the same manner as the band coverings 18 so as to be substantial duplicates thereof. Their ends are spaced from the ends of the adjacent friction elements 18 a distance sufficient to allow for the necessary circumferential movement of the band in expanding, even after the friction surfaces of said elements have been partially worn away.

In order to maintain the interrupted character of the band surface whereby the otherwise uncontrollable wrapping action of the band is broken up, the elements 21, when engaging the drum surface, are held against circumferential movement by separate torque taking means. For this purpose, the frictional material of each auxiliary element is riveted at spaced points to its backing plate 22 from the center of which projects a lug extending through an elongated slot 23 cut along the longitudinal center line of the strip 17. The lug is formed by a U-shaped strap 24 whose ends 25 are disposed within the slot 23 (Fig. 2) and are securely fastened as by welding against the concave surface of the plate 22. An elongated stop lug 26 rigid with the closure plate 13 projects through an aperture formed by the strap internally of the band and serves to guide the element in a radial direction and thereby hold it against circumferential movement when engaging the drum surface.

Each element 21 is drawn inwardly against the band and the latter is contracted by a coiled compression spring 27 suitably seated within the strap 24 and acting between the inner surface of the lug 26 and the closed end of the strap. The lug has formed integral therewith and at right angles thereto a pair of wings 28 which may be welded against the inner surface of the closure plate 13.

With this arrangement, it will be observed that each element 21 floats on the band and is disconnected therefrom so that the band is free to move longitudinally of the element, the slot 23 being long enough to accommodate the ends 25 of the strap and also to allow for the required degree of band movement. Although the elements 21 are individually held against movement circumferentially of the drum, they are free to move radially with the band, and are actually pressed yieldably against the drum in the expansion of the band. By locating the separate torque taking means internally of the band, the elements 21 may be made very thin and the entire layer of friction material may be worn away before the operation of the brake is affected. It will also be observed that the elements 21, are free to tilt laterally about the elongated stop lugs 26 thereby enabling their surfaces to follow the internal contour of the drum surface when the same cones or flares outwardly as the drum becomes heated. The elements 18 being on the flexible strip 17 also follow the cone-shaped contour of the drum under the same conditions.

In addition to forming separate torque taking means for the individual friction elements 21, the three lugs 26 constitute annularly spaced supports for maintaining the band concentric with the drum and also serve to hold the band in fixed axial position. To this end, the lugs have outer surfaces 29 (Fig. 3) spaced equidistant from, and extending parallel to, the drum axis so as to engage the inner surface of the strip 17 and limit contraction of the band which is effected uniformly by the springs 27 in exerting their forces at angularly spaced points around the band. At their ends, the lugs have shoulders 30 which engage the side edges of the strip and thus provide a circumferential guideway in which the band may slide longitudinally in expanding and contracting.

Any preferred type of operator may be employed for expanding the band above described or for contracting the band when the same is disposed externally of the drum. For example, either power actuated or manually operable means may be used as a source of the actuating force, and such force may be applied directly or controlled in its application to the band by mechanical, hydraulic, pneumatic, or electrical operating means or by a combination of such means. In the present instance, an electromagnetically controlled operator of the so-called momentum type is employed for this purpose owing to its powerful character, the ease and sensitiveness with which it may be controlled, and the advantageous manner in which it can be incorporated in the present braking means to form a unitary brake structure.

Generally stated, the operator comprises a pair of friction members, one of which rotates during motion of the vehicle wheel, the other being adapted for oscillatory movement and arranged to be brought into gripping engagement with the rotatable member by an accurately controllable force of electromagnetic attraction, the frictional force thus derived from the momentum or motion of the vehicle being applied directly or through suitable augmenting mechanism to the brake band. The friction members herein employed are annular in form and comprise two substantially rigid rings 31 and 32 of narrow radial width composed of magnetic material and constituting respectively the armature and core of a powerful electromagnet.

Herein the armature is the rotatable member of the friction device and is floatingly supported from the drum by a plurality of strips 33 of spring steel secured at one of their ends to the flattened back surface of the ring 31 at annularly spaced points around its circumference. As shown in Fig. 4, the strips extend tangentially of the ring and are secured at their other ends against a spacer 33ᵃ on the inner surface of the flange 12. The stress under which the strips 33 are initially placed is such as to bow them inwardly from the flange 12, thereby yieldably urging the armature ring along the drum axis. A frictionless axially floating support is thus provided for the ring 31 which is capable of sustaining the torque resulting from the application of a frictional drag to the face of the armature. A pin 34 on the ring 31 projects through a slot in the flange 12 to sustain the rotational torque when the strips 33 are placed under compression, thereby preventing buckling of the strips.

The armature ring has an inwardly facing flat surface disposed in a plane perpendicular to the drum axis. Plates 35 of wear resisting material are set in a groove in the ring surface and provide a surface for sustaining the pressure due to the axial engagement of the two friction elements.

The magnet ring 32 is U-shaped in cross section having two concentrically arranged poles 36 which define a deep annular groove between them in which an annular winding 37 is disposed. The ends of the poles have faces which are separated by plates 38 of non-magnetic and wear resisting material seated on shoulders 39 and having friction surfaces disposed substantially flush with the pole faces. Thus, when the surfaces of the plates 31 and 32 are in mechanical contact, the armature ring and the magnet core form a substantially closed metallic path for the flow of magnetic flux produced by the energization of the winding 37. Such mechanical contact is yieldably maintained at all times by the action of the springs 33. Preferably a minute gap of fixed dimension is interposed in the magnetic circuit to substantially eliminate any residual magnetism which tends to develop upon interruption of the current flow in the winding 37. This may be accomplished by constructing the armature ring in two parts and introducing a strip 40 of non-magnetic material between such parts.

The magnet is rotatably mounted on the annular portion 14 of the drum closure plate and for this purpose carries an internal bushing 41 having bearing on the outer peripheral surface of said portion. A flange 42 on the bushing extends between the magnet and the plate 13 and constitutes a stop for limiting the movement of the magnet by the springs 33. Retainer members 43 secured against the closure plate hold the magnet against this stop. With this arrangement, the magnet is free to expand under the heat developed in the use of the brake without danger of the ring binding and thereby becoming locked against oscillation.

The frictional force derived through the gripping engagement of the magnetic members is, in the present embodiment, applied directly to the band to separate the ends thereof. For this purpose a lug 44 is rigidly secured to the side of the outer magnetic pole and projects into the space between two reinforcing members 45 each secured to one end of the strip 17 along its longitudinal center line and on the inner side of the strip, tapering away from the end of the strip. In this way, the lug 44 is adapted to engage one of the members 45 to force different ends of the band away from brake-released position depending on the direction of rotation of the drum when the magnet is energized.

To hold the other end of the band and thereby cause expansion of the band when one of its ends is actuated by the lug 44, a stationary stop is disposed between the ends of the band and the members 45 and externally of the end of the expanding lug so as to sustain the braking torque due to the action of the band. The stop is in the form of a metal block 46 welded to the closure plate 13 and radially spaced outwardly from the lug 44. Thus the reaction of the stop acts centrally of the band the same as does the actuating force applied by the lug 44. As a result there is no tendency for the band to buckle laterally when placed under compression. A plate 47 secured to the end of the stop serves to retain the ends of the band against lateral displacement. By making the adjacent ends of the reinforcing members 45 of the proper thickness measured radially they will contact the side of the magnet should there be any tendency of the band to flex inwardly at its ends. This prevents the band from slipping off from the torque sustaining surface of the stop 46.

A single means is employed herein for drawing the ends of the band together against the stop 46 and for restoring the magnet to brake-released position when the flow of current in its winding is interrupted. This means comprises two contractile springs 48 having their opposite ends attached to the metal strip a short distance from the ends of the strip. The springs are extensible from either end, the stop 46, through the medium of the band, serving as an anchor for the unmoved ends of the springs. By making the reinforcing members 45 and the lug 44 substantially narrower than the strip 17, the springs 48 may be located remotely from the drum axis on opposite sides of the lug so as to act in a substantially tangential direction and, therefore, at maximum leverage in restoring the magnet to normal position. The springs are under sufficient initial tension to effectually overcome the normal friction between the magnetic elements due to the action of the springs 33.

The electromagnetic attraction of the friction elements to produce varying degrees of braking action may be controlled by the vehicle driver by regulating the current energizing the winding 37. The storage battery, now commonly provided on automotive vehicles, may be employed as a source of current and the regulation may be effected by the manipulation of a rheostat 49 in a circuit such as is shown in Fig. 1. Current may be conducted to one terminal of the winding by an insulated cable 50 attached externally of the plate 13 to a non-rotatable and insulated binding post 51 whose inner end projects into the drum closure about midway between two of the lugs 26. A connection between the inner end of the binding post and the insulated terminal of the magnet winding is effected through the medium of a resilient coil 52 of wire having a washer 53 secured in an eye formed at one end and loosely mounted on the binding post 51. The other end of the coil carries a cross pin 53ª removably held by the coil tension against a hooked yoke 54 mounted on an insulating pad 55 on the side of the magnet and electrically connected to the winding 37. The coil 52 is under sufficient initial tension to remain taut when its movable end is carried toward the stationary end and to allow for additional elongation when the magnet moves in the other direction. Thus the coil is disposed in tangential position in the annular space defined between the brake band and the side of the magnet.

The setting of the brake will now be described to illustrate the simplicity of its operation and the control thereof by the momentum actuator. With the parts in brake-released position, as shown in Fig. 2, energization of the winding 37 by operation of the rheostat causes a magnetic flux proportional to the intensity of the current to flow through the core and armature producing an attractive force acting axially of the magnetic rings. As a result of such gripping engagement, the rotating ring 31 exerts a frictional force on the magnet which moves in the direction of the rotation of the drum away from brake-released position carrying with it the lug 44 and therefore one end of the band against the action of the springs 48. Since the other end of the band is held by the stop 46 against movement in the same direction, the band is placed under longitudinal compression and therefore is expanded, moving all of the friction elements 18 and 21 outwardly against the drum surface. This expansion takes place substantially uniformly throughout the entire length of the band owing to the action of the contracting springs 48. Owing to the flexible character of the strip 17 a state of equilibrium must be established before a braking torque can be exerted and such equilibrium is attained only when all of the braking surfaces are engaging the drum.

As soon as the entire friction surface of the brake is in contact with the drum, further movement of the actuated end of the band is prevented and as a result the frictional force exerted by the magnet is overcome so that the latter slips relative to the armature ring 31 but continues to apply the actuating force whose magnitude is determined by the strength of the current in the winding. This force is augmented mechanically by the strip 17 and is applied as a radial pressure uniformly distributed over all of the friction surfaces owing to the fact that such surfaces are backed by a flexible member. Since the strip 17 reduces the circumferential movement of the expanding lug 44 $2\pi$ or 6.28 times in moving the friction surfaces radially, the degree of augmentation of the applied force is increased accordingly. It will be observed that the braking torque resulting from the action of the magnet on the band is sustained by the stop 46 while the torque produced at the surfaces of the elements 21 is sustained by their individual stops 26.

In addition to the above retarding effect attributable directly to the actuating force derived from the momentum of the vehicle, the total retarding effect produced by the brake includes an auxiliary braking torque which is due to the wrap or self-energizing actions of the various portions of the band and which develop as soon as the friction surfaces, both on the band and on the elements 21, have been brought into engagement with the drum and pressure applied. Thus the drum reactions acting radially on the surfaces of the elements 18 produce frictional forces acting circumferentially of the band in the direction of drum rotation, and these forces put the band under further compressive stress, the band serving to augment the forces thus generated in the same manner as above described and apply the same uniformly to the subsequent brake surfaces whether they be on the band or on the elements 21. Owing to the flexible character of the band, the increased drum reaction on any surface will be transmitted reversely by the band toward the surface causing such reaction, and as a result a state of equilibrium will be established between all of the surfaces of the brake.

It will thus be apparent that wrapping actions originate at a plurality of spaced points around the drum. These wrap actions are, in each instance, a function of the actuating force applied to the band and therefore are proportional to the intensity of the current supplied to the magnet winding which can be regulated accurately by, and is always under the sole control of the vehicle driver since the magnetic circuit is of invariable reluctance. The spaces formed by interrupting the band surface permit of the location therein of the auxiliary elements 21 which provide additional friction surfaces under pressure and thereby further increase the braking torque over and above what would be obtained by the utilization of the wrapping effects on the associated portions of the band alone.

So long as the magnet winding remains energized, the brake will remain set but the degree of braking action may be increased or decreased as desired by varying the intensity of the current. For example, if the rheostat is operated to increase the current the magnet rings 31 and 32 would grip each other more firmly and produce a greater actuating force and therefore a corresponding increase in the total retarding effect. Upon de-energization, which takes place instantly when the current flow is interrupted owing to the presence of the fixed gap 40 in the magnetic circuit, the axial pressure between the magnetic elements causing the actuating force is relieved, whereupon the springs 48 acting on the actuated end of the band restore the band and the magnet to brake-released position, uniform contraction of the band being insured by the three springs 27 which all retract the elements 21 away from the drum.

It will be apparent that the brake thus provided is rendered extremely economical of construction because of the small number of parts employed, and the simple structural characteristics of such parts. At the same time, the brake is an exceedingly compact self-contained unit both as regards axial and radial dimensions and can readily be adapted to standard steering knuckles, being thereby particularly adapted for use on automotive vehicles. It is powerful and invariable in its action because it utilizes an actuating force derived from the momentum of the vehicle, this force acting directly to produce braking torque and indirectly to cause the generation of controllable wrap actions which in turn greatly augment the first mentioned torque. Practically the entire surface of the drum is utilized when the brake is applied in either direction of drum rotation. The braking surfaces, while of such character as not to be susceptible of chattering, have nevertheless sufficient flexibility to follow an irregular drum contour and wear uniformly.

The claims in the present instance are confined to features of the momentum operator, a combination thereof with the band brake having one or more fixed segments, and to the particular arrangement of the several fixed and movable segments. Claims generic to the friction brake, disclosed herein apart from the operator, are included in my co-pending applications Serial No. 280,173 filed May 24, 1928 and Serial No. 393,955 filed September 20, 1929, to which the present application is subordinate.

I claim as my invention:

1. A brake comprising, in combination, a rotatable drum, a band extending circumferentially around substantially the entire surface of the drum and having a plurality of annularly spaced friction surfaces, a plurality of devices arranged between said band and said drum and providing auxiliary surfaces alternating with said first mentioned surfaces, said devices being individually held against circumferential movement, the number of devices being less than the number of said surfaces, and operating means for said band.

2. A brake comprising, in combination, a rotatable drum, a band extending circumferentially around substantially the entire surface of the drum and having a plurality of annularly spaced friction surfaces, a plurality of devices arranged between said band and said drum and providing auxiliary surfaces alternating with said first mentioned surfaces, and means for holding said devices against circumferential movement.

3. A friction brake comprising, in combination, a rotatable drum, a friction brake band extending around a cylindrical surface of said drum and having its ends arranged adjacent each other for relative circumferential movement, means for actuating said band including a lug which is narrower than said band and arranged for circumferential movement to move one end of the band relative to the other end, and a pair of contractile springs disposed on opposite sides of said lug and attached at opposite ends to the ends of said band.

4. A friction brake comprising, in combination, a rotatable drum, a friction brake band extending around a cylindrical surface of said drum and having its ends arranged adjacent each other for relative circumferential movement, means for actuating said band including an annular friction member arranged for oscillatory movement about the drum axis, means on said member projecting into operative association with the ends of said band and operable to move one of said ends in the movement of said member away from brake released position, and a contractile spring stretched between opposite ends of said band and acting through the medium of said band and said last mentioned means to restore said member to brake-released position.

5. An electric brake having, in combination, a rotatable drum, a non-rotatable support, braking means extending around and engageable with a cylindrical surface of the drum, a magnet arranged for oscillation about the drum axis and spaced from said braking means, and means providing an energizing circuit for said magnet including an extensible and contractible conductor disposed in tangential position in the space between said braking means and said magnet and having one end connected to said support and the other end movable with said magnet.

6. An electric brake having, in combination, a rotatable drum, a non-rotatable support, braking means extending around and engageable with a cylindrical surface of the drum, a magnet arranged for oscillation about the drum axis and spaced from said braking means, and means providing an energizing circuit for said magnet including an extensible and contractible conductor disposed in the space between said braking means and said magnet and having one end connected to said support and the other end connected to the side of said magnet.

7. An electric brake having, in combination, a non-rotatable member closing said drum, braking means engageable with the drum, a magnetic member having a winding mounted for oscillation about the drum axis, and means providing an energizing circuit for said winding including a contractible conductor having one end connected to one of said members and the other end held by and removable from a hook on said other member.

8. A self-energizing brake having, in combination, a cylindrical surface rotatable with the part to be braked, a second rotatable surface angularly disposed with respect to the rotational axis of said cylindrical surface, a relatively non-rotatable friction element engageable with said cylindrical surface, a second friction element adapted for gripping engagement with said second surface to derive an actuating force, and a third friction element adapted to receive said actuating force and to be forced thereby into gripping engagement with said cylindrical surface, said third element acting with a self-energizing action to augment said actuating force and to apply the augmented force to said first mentioned element to force the latter against said cylindrical surface.

9. A friction brake for a vehicle wheel rotatable on a steering knuckle comprising, in combination, a drum rotatable with said wheel with its open end projecting inwardly from the wheel beyond said steering knuckle, a centrally apertured plate received on said knuckle with its inner edge secured thereto, said plate intermediate its inner and outer peripheral edges being formed with a cylindrical flange so that the inner peripheral portion of the plate defines a recess in which said knuckle is received, a friction braking element engageable with the inner surface of said drum and anchored by said plate, a momentum actuator for said element including a magnet ring disposed within the drum and encircling said cylindrical flange, the latter forming an internal bearing supporting said ring concentric with and for oscillation about the drum axis.

10. A friction brake combining a rotatable drum, a centrally apertured anchor plate closing the open end of said drum and having its inner peripheral portion dished into the drum to form within the drum an external cylindrical surface, a friction element engageable with the internal drum surface and anchored by said plate, and an actuator for said brake including a magnet ring of a diameter greater than said cylindrical surface, said surface forming an internal bearing support for said ring to permit of thermal expansion of the ring and of oscillation thereof about the drum axis.

11. A friction brake combining a rotatable drum, a centrally apertured anchor plate closing the open end of said drum and having its inner peripheral portion dished into the drum to form within the drum an external cylindrical surface, a friction element engageable with the internal drum surface and anchored by said plate, an actuator for said brake including a magnet ring of a diameter greater than said cylindrical surface, and a bushing encircling and supported by said surface and forming an internal bearing for said ring to support the latter for oscillation about the drum axis.

In testimony whereof, I have hereunto affixed my signature.

JOHN WHYTE.